United States Patent
Regnier et al.

(10) Patent No.: US 8,467,123 B2
(45) Date of Patent: Jun. 18, 2013

(54) IONIZING RADIATION-RESISTANT OPTICAL FIBER AMPLIFIER

(75) Inventors: Elise Regnier, Bievres (FR); Alain Pastouret, Massy (FR); Ekaterina Burov, Boulogne-Billancourt (FR)

(73) Assignee: Draka Comteq B.V., Amsterdam (NL)

( * ) Notice: Subject to any disclaimer, the term of this patent is extended or adjusted under 35 U.S.C. 154(b) by 755 days.

(21) Appl. No.: 12/633,229

(22) Filed: Dec. 8, 2009

(65) Prior Publication Data

US 2010/0142033 A1 Jun. 10, 2010

Related U.S. Application Data

(60) Provisional application No. 61/120,682, filed on Dec. 8, 2008.

(30) Foreign Application Priority Data

Dec. 8, 2008 (FR) ..................... 08 06864

(51) Int. Cl.
*G02B 6/02* (2006.01)
*C03C 3/095* (2006.01)
*C03C 14/00* (2006.01)
*C03B 37/012* (2006.01)
*C03B 37/016* (2006.01)
*G01S 3/16* (2006.01)
*H01S 3/16* (2006.01)
*C03C 13/04* (2006.01)

(52) U.S. Cl.
CPC ............... *H01S 3/169* (2013.01); *H01S 3/1608* (2013.01); *H01S 3/1655* (2013.01); *C03C 3/095* (2013.01); *C03C 13/045* (2013.01); *C03C 14/004* (2013.01); *C03B 37/016* (2013.01); *C03B 37/01202* (2013.01); *Y10S 977/951* (2013.01)

USPC ........ 359/341.5; 359/342; 385/123; 977/951; 65/399; 65/396; 501/37; 501/54; 501/64

(58) Field of Classification Search
USPC ............................................ 65/395, 396, 399
See application file for complete search history.

(56) References Cited

U.S. PATENT DOCUMENTS 4,419,115 A * 12/1983 Johnson et al. ................. 65/395
4,574,063 A * 3/1986 Scherer ........................... 65/395

(Continued)

FOREIGN PATENT DOCUMENTS

EP 1764350 A 3/2007
EP 1921478 A1 5/2008

(Continued)

OTHER PUBLICATIONS

Tammela, S.; Hotoleanu, M.; Janka, K.; Kiiveri, P.; Rajala, M.; Salomaa, A.; Valkonen, H.; Stenius, P.; , "Potential of nanoparticle technologies for next generation erbium-doped fibers," Optical Fiber Communication Conference, 2004. OFC 2004 , vol. 2, no., pp. 3 pp. vol. 2, Feb. 23-27, 2004 URL: http://ieeexplore.ieee.org/stamp/stamp.jsp?tp=&arnumber=.*

(Continued)

*Primary Examiner* — Mark Hellner
*Assistant Examiner* — Ari M Diacou
(74) *Attorney, Agent, or Firm* — Summa, Additon & Ashe, P.A.

(57) ABSTRACT

Disclosed is an optical fiber that includes a central core that is suitable for transmitting and amplifying an optical signal and an inner optical cladding that is suitable for confining the optical signal transmitted within the central core. The central core is formed from a core matrix that contains silica-based nanoparticles doped with at least one rare earth element.
The disclosed optical fiber can be used with limited optical losses even in an environment with strong ionizing radiation.

27 Claims, 2 Drawing Sheets

U.S. PATENT DOCUMENTS

| | | | | |
|---|---|---|---|---|
| 4,684,387 A * | 8/1987 | Clasen et al. | 264/1.21 |
| 4,690,504 A | 9/1987 | Yokokawa et al. | |
| 4,775,401 A * | 10/1988 | Fleming et al. | 65/395 |
| 4,838,643 A | 6/1989 | Hodges et al. | |
| 5,123,940 A * | 6/1992 | DiGiovanni et al. | 65/395 |
| 5,509,101 A | 4/1996 | Gilliland et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,457,329 B1 * | 10/2002 | Bhandarkar et al. | 65/17.2 |
| 6,493,491 B1 | 12/2002 | Shen et al. | |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,749,446 B2 | 6/2004 | Nechitailo | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 6,947,650 B1 | 9/2005 | Homa | |
| 7,045,010 B2 | 5/2006 | Sturman, Jr. | |
| 7,162,128 B2 | 1/2007 | Lovie et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,407,604 B2 * | 8/2008 | Kear et al. | 252/301.4 F |
| 7,483,613 B2 | 1/2009 | Bigot-Astruc et al. | |
| 7,515,795 B2 | 4/2009 | Overton et al. | |
| 7,526,167 B1 * | 4/2009 | Minelly | 385/126 |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,657,142 B2 | 2/2010 | Gasca et al. | |
| 7,817,891 B2 | 10/2010 | Lavenne et al. | |
| 2002/0013209 A1 * | 1/2002 | Prassas et al. | 501/64 |
| 2002/0124601 A1 * | 9/2002 | Bandyopadhyay et al. | 65/390 |
| 2003/0024277 A1 * | 2/2003 | Costa et al. | 65/395 |
| 2003/0174994 A1 * | 9/2003 | Garito et al. | 385/129 |
| 2003/0175003 A1 * | 9/2003 | Gasca et al. | 385/142 |
| 2004/0187524 A1 * | 9/2004 | Sen et al. | 65/390 |
| 2008/0285930 A1 * | 11/2008 | Gasca et al. | 385/127 |
| 2008/0292262 A1 | 11/2008 | Overton et al. | |
| 2009/0116798 A1 * | 5/2009 | Blanchandin et al. | 385/123 |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0220965 A1 * | 9/2010 | Rajala et al. | 385/123 |
| 2011/0033162 A1 * | 2/2011 | Simonneau et al. | 385/127 |

FOREIGN PATENT DOCUMENTS

| | | | |
|---|---|---|---|
| EP | 2194408 A1 | | 6/2010 |
| WO | WO02060830 A1 * | | 8/2002 |
| WO | 2005/109055 A2 | | 11/2005 |
| WO | 2007/020362 A | | 2/2007 |
| WO | 2009/062131 A1 | | 5/2009 |

OTHER PUBLICATIONS

A. Le Sauze, et al. "Nanoparticle Doping Process: towards a better control of erbium incorporation in MCVD fibers for optical amplifiers," in Optical Amplifiers and Their Applications, OSA Technical Digest Series (Optical Society of America, 2003), paper WC5. http://www.opticsinfobase.org/abstract.cfm?URL=OAA-2003-WC5.*

U.S. Appl. No. 12/098,804 for a "Transmission Optical Fiber Having Large Effective Area," Sillard et al., filed May 6, 2009.

Tammela et al., "Direct Nanoparticle Deposition process for manufacturing very short high gain Er-doped silica glass fibers," ECOC 2002; 28th European Conference on optical communication; IEEE; Piscataway, NJ, U.S.A., vol. 4, 2002, pp. 1-2.

Henschel et al., "Radiation-Induced loss of Rare Earth doped silica fibers", IEEE 1998, pp. 439-444.

French Search Report and Written Opinion in counterpart French Application No. 0806864 dated Sep. 18, 2009, pp. 1-9.

European Search Report in counterpart European Application No. 09015061 dated Jan. 12, 2010, pp. 1-7.

* cited by examiner

IONIZING RADIATION-RESISTANT OPTICAL FIBER AMPLIFIER

CROSS-REFERENCE TO PRIORITY APPLICATIONS

This application claims the benefit of pending French Application No. 08/06864 for "Fiber Optique Amplificatrice Resistante Aux Radiation Ionisantes" (filed Dec. 8, 2008, at the French Patent Office), which is hereby incorporated by reference in its entirety.

This application further claims the benefit of commonly assigned U.S. Provisional Patent Application Ser. No. 61/120, 682, for "Fiber Optique Amplificatrice Resistante Aux Radiation Ionisantes" (filed Dec. 8, 2008), which is hereby incorporated by reference in its entirety.

FIELD OF THE INVENTION

The present invention relates to the field of optical fibers and, more specifically, amplifying optical fibers suitable for amplifying transmitted optical signals. The amplifying fibers can be used, for example, as high-speed transmission line amplifiers or in lasers. Embodiments of the present invention relate to the use of such an amplifying fiber in an environment with ionizing radiation. Furthermore, embodiments of the present invention relate to methods for producing such a fiber.

BACKGROUND

Typically, an optical fiber is composed of a central core (i.e., an optical core or optical-fiber core), which transmits and/or amplifies an optical signal, and an inner optical cladding which confines the optical signal within the central core. In this regard, the refractive indices of the central core ($n_c$) and the cladding ($n_g$) are such that $n_c > n_g$.

Fiber amplifiers (e.g., fibers doped with rare earth elements) are commonly used for optical applications. For example, erbium doping may be used in optical telecommunication systems for amplifying transmitted optical signals. Such fibers are used in erbium-doped fiber amplifiers (i.e., EDFAs). Erbium-doped fiber amplifiers can have a central core composed of a silica matrix (i.e., a core matrix of silica) that includes doping elements, such as erbium at concentrations of about 250 ppm to 1000 ppm (0.025 to 0.1 weight percent). Furthermore, combining complementary doping elements may improve amplification (e.g., alumina for broadening the gain bandwidth for wavelength dense multiplexing (WDM) applications).

Ytterbium doping is often used in fibers for laser applications. Ytterbium can also be used in erbium-doped fiber amplifiers to improve the effectiveness of absorption of the pump signal by the erbium. Similarly, other rare earth elements can be used alone or in combination depending on the sought applications.

Optical amplification in a rare-earth-doped optical fiber can be achieved by injecting into the optical fiber a pump signal, which excites the rare earth ions (e.g., $Er^{3+}$ in EDFA). When a light signal passes through this portion of optical fiber, it de-energizes the ions by stimulated emission. In this regard, a photon is produced that is identical in all respects to the incident photon. The light signal is thus doubled. Other rare earth elements (e.g., ytterbium (Yb) and/or thulium (Tm)) can be used as doping elements for amplification of the signal. The other rare earth elements may replace the erbium or be used in combination with the erbium. A portion of such an optical fiber in combination with a resonating cavity formed by a system of mirrors, or Bragg gratings, produces an optical-fiber laser. The wavelength and power of the laser typically depend on the rare earth element used and its concentration.

Amplifying optical fibers are typically produced by incorporating rare earth ions in the silica matrix of the central core (i.e., the core matrix). The rare earth ions incorporated into the central core are typically accompanied by other dopants for improving the amplification gain, widening the amplification band, and/or limiting inhomogeneities in the dispersion of the rare earth dopants in the core matrix. For example, the rare earth dopants may be accompanied by alumina ($Al_2O_3$) and/or phosphorus (P). Exemplary amplifying optical fibers may also contain germanium (Ge) in the central core to ensure the refractive index profile (e.g., a step index profile) necessary for guiding and confining the transmitted signal in the central core.

Signals transmitted in optical fibers typically undergo optical losses that accumulate over the distance traveled. These transmission losses increase substantially when the optical fiber is subjected to ionizing radiation such as beta, alpha, gamma rays, and/or X-rays. The optical fiber may be subjected to such radiation when it is used in an optical system containing ionizing radiation (e.g., a nuclear power plant, a particle acceleration laboratory or a satellite in space). In such an environment, the ionizing radiation can reach levels greater than or equal to 100 gray. For example, the radiation in a space environment can reach levels of 10,000 rad, while the radiation in nuclear power plants may be on the order of a megagray ($10^8$ rad).

Typically, when conventional radiation-resistant optical fibers are used in radioactive environments, the transmitted optical signal is amplified using electronic systems (i.e., amplifying optical fibers are typically not used). However, a system for amplifying optical signals in radioactive environments that does not use electronic systems (i.e., an all-optical system) would be more desirable.

Passive optical fibers (i.e., fibers that are not doped with rare earth ions) have been designed to be used in radioactive environments. For example, U.S. Pat. No. 4,690,504, which is hereby incorporated by reference in its entirety, discloses an exemplary optical fiber without germanium (Ge) in its core. The absence of germanium in the central core improves the optical fiber's resistance to ionizing radiation. The inner optical cladding is doped (e.g., with fluorine) to reduce the refractive index of the silica. This patent also discloses an exemplary embodiment of an optical fiber having a core, which is lightly doped with fluorine to compensate for a surplus of oxygen in the core.

U.S. Pat. No. 5,509,101, which is hereby incorporated by reference in its entirety, discloses an exemplary optical fiber that is resistant to X-rays and gamma rays. The central core and cladding of this exemplary optical fiber are doped with fluorine. This patent describes several exemplary embodiments with different concentrations of fluorine and germanium. This patent also suggests that including germanium in the central core may reduce transmission losses.

Tammela et al., "*Direct Nanoparticle Deposition process for manufacturing very short high gain Er-doped silica glass fibers,*" ECOC 2002; 28th European Conference on optical communication; IEEE; Piscataway, N.J., U.S.A., Vol. 4, 2002, page 2, which is hereby incorporated by reference in its entirety, discloses an exemplary vapor-based process in which glass forming elements and dopants are reacted in a torch to manufacture highly erbium-doped fibers to be used in compact amplifiers.

International Publication No. 2005/109055 (and its counterpart U.S. Pat. No. 6,947,650), which is hereby incorporated by reference in its entirety, discloses an exemplary optical fiber with a pure silica core and a cladding doped with fluorine. This document suggests that a high ratio between the diameters of the inner optical cladding and the core (e.g., between about 9 and 10) may improve the resistance of the fiber to ionizing radiation.

Typically, fibers with a pure silica core, or a central core doped with fluorine, exhibit smaller losses in a radioactive environment compared to (i) fibers having a silica core doped with germanium, and (ii) fibers containing phosphorus in the central core or cladding. Amplifying fibers typically require rare earth dopants in the central core, and may include dopants for improving the gain of the optical fiber. However, the incorporation of these dopants in the central core of an amplifying fiber leads to significant losses when the fiber is subjected to ionizing radiation. Additionally, the presence of alumina or phosphorus in an optical fiber leads to an increase in optical losses when the fiber is subjected to ionizing radiation.

The publication of H. Henschel et al., "*Radiation-Induced loss of Rare Earth doped silica fibers*", IEEE 1998, pp. 439-444, which is hereby incorporated by reference in its entirety, recognizes the problem of increased losses in amplifying fibers in a radioactive environment. This publication proposes limiting the concentrations of dopants, but fails to specify a method for manufacturing a radiation-resistant amplifying optical fiber.

U.S. Patent Publication No. 2003/175003, which is hereby incorporated by reference in its entirety, describes an exemplary method for producing an amplifying optical fiber in which the rare earth elements are introduced into the central core by the incorporation of nanoparticles. The matrix of the nanoparticles (i.e., the nanoparticle matrix) has a composition different from that of the central core. The nanoparticles have an alumina ($Al_2O_3$) or antimony trioxide ($Sb_2O_3$) matrix doped with erbium. However, such nanoparticles are not designed to resist radiation.

A need therefore exists for an amplifying or laser fiber, which can be used in an environment with strong ionizing radiation with limited optical losses.

SUMMARY

To this end, the invention proposes an optical fiber including rare earth dopants in its central core without the addition of any other radiation sensitive dopants (e.g., alumina or phosphorus). The absence of such dopants also minimizes the optical losses of the fiber measured outside the absorption bands of the rare earth ions and before implementation in a radioactive environment (i.e., the level of background losses before irradiation). Such an optical fiber can be obtained by incorporating rare-earth-doped pure silica nanoparticles into the central core.

In one aspect, the invention is related to an optical fiber including a central core suitable for transmitting and amplifying an optical signal and an inner optical cladding surrounding the central core for confining the transmitted optical signal within the core. Typically, the central core includes a core matrix containing rare-earth-doped nanoparticles having a silica-based matrix containing at least 85 weight percent (85 percent by weight) silica. More typically, the nanoparticle matrix contains at least 95 weight percent (95 percent by weight) silica.

In one embodiment, the core matrix is a silica-based matrix containing no phosphorus and/or alumina. In another embodiment, the core matrix is a pure silica matrix. In yet another embodiment, the core matrix is a fluorine-doped silica-based matrix. In one embodiment, the core matrix is a nitrogen-doped, silica-based matrix. In another embodiment, the core matrix is a germanium-doped silica-based matrix.

In one exemplary embodiment, the nanoparticle matrix is a pure silica matrix. In another embodiment, the nanoparticle matrix contains alumina such that the concentration of alumina in the central core is less than 3 weight percent. In yet another embodiment, the optical fiber includes rare earth dopants, such as erbium, ytterbium, and/or thulium.

In one embodiment, the optical fiber (e.g., an amplifying fiber or a laser fiber) of the present invention has a gain width of between about 1 nanometer and 40 nanometers (e.g., between 1 nanometer and 30 nanometers). Typically, before any irradiation, the optical fiber has optical losses outside the absorption band of erbium less than or equal to 1.5 dB/km at 1200 nanometers. An exemplary amplifying optical fiber, at ambient temperature, has an optical loss increment of less than 0.05 dB/m at 1550 nanometers under irradiation of 300 gray at 0.08 Gy/min (i.e., 8 rad/min).

One embodiment of the invention is an optical amplifier including a portion of optical fiber doped with erbium, in which the length of fiber necessary for amplification with a gain of 25 dB at 1550 nanometers is less than 10 m.

In one aspect, the invention is related to a laser including a portion of optical fiber having a central core, which includes a core matrix containing rare-earth-doped nanoparticles (e.g., discrete nanoparticles) having a silica-based matrix containing at least 85 weight percent silica.

An exemplary method includes: (i) chemically synthesizing rare-earth-doped silica-based nanoparticles containing at least 85 weight percent silica (e.g., at least 95 percent); (ii) dispersing the nanoparticles in an aqueous solution; and (iii) impregnating an internal porous layer of a silica tube with the aqueous solution.

In one exemplary embodiment, the synthesis of the nanoparticles is carried out in such a way that the molar ratio of silica salt precursors to rare earth salt precursors is between about 30 and 300.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
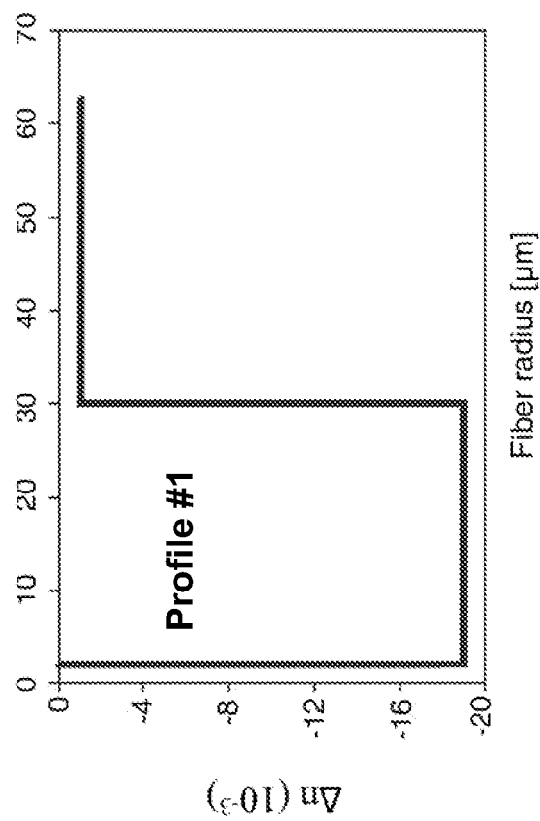
FIG. 1 graphically depicts the refractive index profile of a fiber according to one embodiment of the present invention.

An exemplary optical fiber includes (i) a central core for transmitting and amplifying an optical signal, (ii) an inner optical cladding surrounding the central core for confining the transmitted optical signal within the central core, and (iii) an outer optical cladding composed of, for example, silica.

Typically, the central core and the inner optical cladding are obtained by gas-phase deposition (e.g., CVD, OVD, VAD, etc). In the case of a CVD method, the outer optical cladding is typically constituted by a deposition tube. In some embodiments the outer optical cladding may be provided by refilling or sleeving. In general, the relatively less volatile elements (rare earths, alumina, etc.) are incorporated by impregnation of a porous silica rod during a CVD operation to form the central core of the primary preform.

The central core typically includes a silica-type matrix and nanoparticles doped with rare earth elements. The core matrix and the nanoparticle matrix are designed to reduce or eliminate radiation sensitive dopants. For example, incorporating rare earth ions into pure silica nanoparticles enables the introduction of rare earth ions into the central core without incorporating other radiation sensitive dopants. It is thus possible to obtain an active fiber (i.e., an amplifying fiber or a laser fiber) containing no traces of phosphorus (P) or alumina ($Al_2O_3$). The nanoparticles may, however, contain elements other than the rare earth dopants. For example, the silica matrix of the nanoparticles may contain alumina, which limits the formation of packets of $Er^{3+}$ ions. However, the concentration of alumina in the central core is typically somewhat less than the concentration of alumina in conventional optical fibers.

In one exemplary embodiment, the central core includes a pure silica matrix containing discrete, rare-earth-doped pure silica nanoparticles. In this regard, the optical fiber is particularly resistant to ionizing radiation. The central core may, however, include other dopants, which are not radiation sensitive or are only slightly radiation sensitive (e.g., fluorine and/or nitrogen). In exemplary embodiments of amplifying fibers intended for use over relatively short distances, the central core may include germanium.

If the central core is made of pure silica or doped with fluorine, the inner optical cladding will typically be a buried cladding (i.e., an optical trench having a refractive index less than that of the outer optical cladding) to ensure the guiding of the optical signal in the central core. In such embodiments, the inner optical cladding may be doped with fluorine or include microperforations.

In order to adjust the optogeometrical parameters of the fiber (e.g., the cut-off wavelength or mode diameter) the central core may be doped with germanium. In embodiments including a central core of silica doped with germanium or nitrogen, the inner optical cladding typically includes pure silica or silica lightly doped with fluorine and/or germanium. Adjusting the optogeometrical parameters improves compatibility with other optical fibers of standardized systems, but the radiation resistance of the optical fiber is typically lower when the central core contains germanium.

Figure 2:
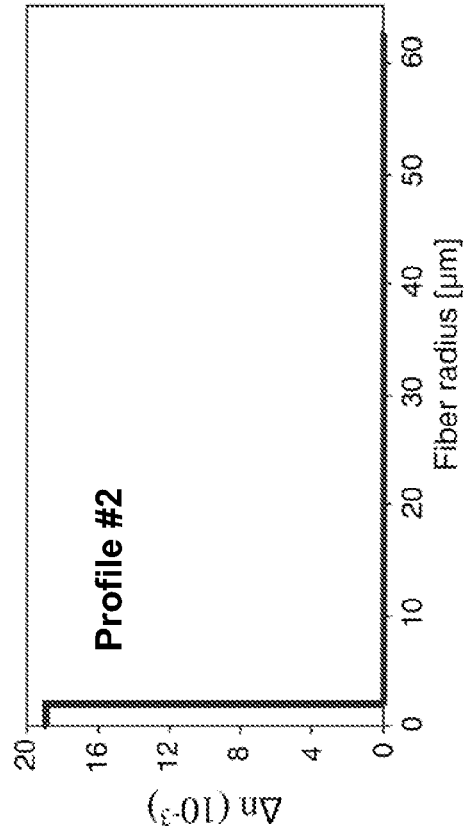
FIG. 2 graphically depicts the refractive index profile of a fiber according to another embodiment of the present invention.

FIGS. 1 and 2 illustrate two exemplary refractive index set profiles for embodiments of an amplifying fiber according to the invention.

For optical fibers, the refractive index set profile is generally depicted in graphs wherein the refractive index difference of the optical fiber is plotted as a function of the distance from the center of the optical fiber along the radius. Typically, the distance along the radius from the center of the fiber is shown on the x-axis, and the refractive index difference between the optical fiber and a reference index is shown on the y-axis.

Those having ordinary skill in the art will understand that refractive-index percentages and index differences $\Delta n$ are readily compared by the following approximate relationship: $\Delta\% = (\Delta n/n_{ref}) \times 100\%$, where $n_{ref}$ is the refractive index of a reference material. For example, where the reference material is pure silica, $n_{ref}$ is 1.45, the refractive index of pure silica. In FIG. 1, the reference material is the central core, so $n_{ref}$ is the refractive index of the central core. Similarly, as depicted in FIG. 2, where the reference material is the inner optical cladding, $n_{ref}$ is the refractive index of the inner optical cladding.

FIG. 1 graphically depicts the refractive index profile of an optical fiber according to one embodiment of the present invention. In the depicted embodiment, the core (i.e., the optical-fiber core or central core) is made of pure silica (including rare-earth-doped nanoparticles), and the inner optical cladding of the fiber is a buried cladding (e.g., silica doped with fluorine) having an index difference ($\Delta n$) of $-19 \times 10^{-3}$ with the central core. The outer optical cladding is made of silica lightly doped with fluorine having an index difference of $-1 \times 10^{-3}$ with pure silica. The core diameter (i.e., the diameter of the central core) is 4 microns, and the ratio of the inner optical cladding diameter to the core diameter is approximately 15. The optical fiber of this embodiment ensures satisfactory confinement of the signal within the central core, while incorporating only rare earth dopants in the central core limits optical losses in a radioactive environment.

FIG. 2 graphically depicts the refractive index profile of a fiber according to one embodiment of the present invention. In the depicted embodiment, the central core, which includes rare-earth-doped nanoparticles, is made of silica doped with germanium. The central core has a refractive index difference of $+19 \times 10^{-3}$ with the inner optical cladding. The inner optical cladding is composed of silica co-doped with germanium and fluorine, and the outer optical cladding is made of pure silica. The core diameter is 3.6 microns. The ratio of the inner optical cladding diameter to the core diameter depends on the refractive index of the inner optical cladding. The greater the inner optical cladding is buried, the higher the ratio of the inner optical cladding diameter and the core diameter must be. If the inner optical cladding's refractive index is equal to the outer optical cladding's refractive index, this ratio can be considerably reduced (e.g., a ratio of about 3). The optical fiber of this embodiment ensures satisfactory confinement of the signal within the central core with a reduced production cost. The presence of germanium in the central core leads to a greater optical loss increment in a radioactive environment than that of the embodiment of FIG. 1, but the optical loss increment remains limited.

Figure 3:
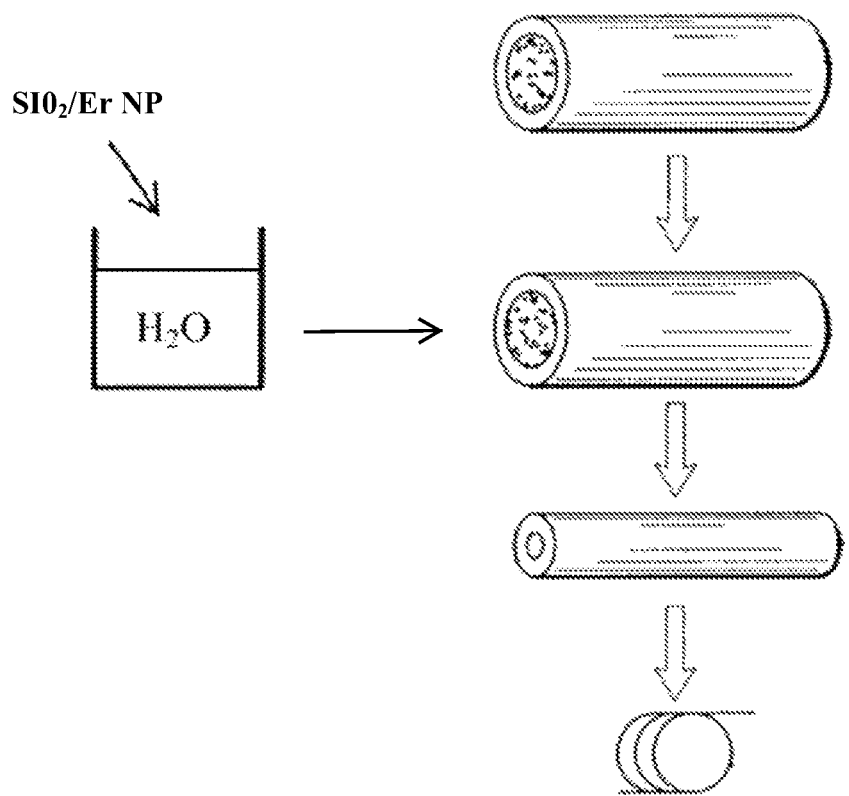
FIG. 3 schematically depicts the steps in an exemplary method for producing an optical-fiber preform and corresponding amplifying optical fiber according to the present invention.

FIG. 3 schematically depicts the steps in an exemplary method for producing an optical-fiber preform and corresponding amplifying optical fiber according to the present invention. Nanoparticles of silica doped with erbium can be produced by chemical or physical synthesis and dispersed in an aqueous solution.

For example, nanoparticles may be produced in an aqueous solution at a controlled pH by co-precipitation of precursors of silica salts and rare earth salts. The molar ratio of the precursors of silica salts and rare earth salts is typically between 30 and 300 to yield nanoparticles having a silica-based matrix containing at least 85 weight percent silica (e.g., at least 95 weight percent silica).

The size of the nanoparticles is affected by the reaction parameters, such as the quantity of catalyst, the concentration of the reagents, the reaction time, the ionic strength of the medium, and/or the presence of surfactants. In this regard, these parameters may be controlled to yield nanoparticles of a particular size, which are then washed and re-dispersed in an aqueous solution (e.g., water), at a defined concentration. In one embodiment including alumina in the nanoparticle matrix, aluminum precursors are added to the co-precipitation. Typically, the nanoparticle matrix will contain at least 85 weight percent silica, and preferably at least 95 weight percent. Furthermore, the addition of the aluminum is typically limited so that the concentration of alumina in the central core is less than 3 weight percent.

Any rare earth element (or combination of rare earth elements) allowing amplification by optical pumping over a given spectral window may be used. Typically, erbium, ytterbium, and/or thulium will be used.

A silica tube having a porous inner layer and cladding formed by a silica tube is produced by MCVD. The solution of nanoparticles in stable suspension is then used to impregnate the silica tube's porous inner layer during an MCVD operation. In this regard, the silica tube's impregnated porous layer eventually forms the doped core of the primary preform. The primary preform is then dried, vitrified and contracted.

To achieve the appropriate refractive index profile, the inner optical cladding is typically produced by an MCVD operation or by a PCVD operation (e.g., when the inner optical cladding is highly doped with fluorine).

Typically, the primary preform is also subjected to a refilling operation or sleeving in order to form an optical-fiber preform, which can be used in a fiber-drawing tower to yield an optical fiber.

The production method in accordance with the present invention yields an amplifying optical fiber having a concentration of rare earth dopants sufficient to ensure satisfactory amplification over a determined spectral window, while having satisfactory resistance to radiation.

In another embodiment, depending on the element used and the gain sought, the concentration of rare earth elements in the central core is typically at least about 100 ppm and typically no more than a few weight percent. The amplification spectral window depends upon the rare earth elements present in the optical fiber. For example, about twenty meters of an optical fiber containing approximately 300 ppm of erbium will be sufficient to obtain an EDFA having a gain of 23 dB at 1550 nanometers. By increasing the concentration of erbium in the optical fiber, it is possible to obtain an EDFA having a gain of 25 dB at 1550 nanometers with a fiber length of less than 10 m. In this regard, the gain of an optical fiber according to the invention is dependent upon the concentration and type of rare earth element used.

In one embodiment, the optical fiber has a gain width of between about 1 nanometer and 40 nanometers (e.g., between about 1 nanometer and 30 nanometers). The gain width of the optical fiber is for the most part dependent upon the quantity of alumina introduced into the nanoparticle matrix, but those of ordinary skill in the art will understand that other factors may affect the gain width.

Typically, the background losses (i.e., outside the absorption band of the rare earth ion) of a rare-earth-doped optical fiber are primarily determined by the losses of the core matrix. In this regard, the background losses of optical fibers of the invention will remain limited both before and after irradiation. For example, before irradiation, an optical fiber with a silica-based core matrix doped with germanium containing nanoparticles doped with erbium exhibits losses of less than 2 dB/km at a wavelength of 1200 nanometers. As will be understood by those of ordinary skill in the art, a wavelength of 1200 nanometers is typically used to characterize the background losses of erbium-doped fibers. In embodiments including a pure silica core matrix, the background losses at 1200 nanometers are less than 1.5 dB/km. Adding dopants (e.g., alumina) typically leads to increased losses. For example, the addition of 6 weight percent of alumina typically results in losses up to about 6 dB/km. If a particular property is desired (e.g., a certain gain width), adding the alumina to the silica nanoparticle matrix rather than to the core matrix requires less alumina. In this regard, the reduction in alumina content reduces losses.

After irradiation at ambient temperature and a rate of 0.08 Gy/min (i.e., 8 rad/min), for a total dose of 300 Gy, the attenuation increment of the optical fiber according to one embodiment of the invention is less than 0.05 dB/m at 1550 nanometers. A total radiation dose of 300 Gy is a typical dose in a space environment over approximately 15 years, or in a part of a nuclear power plant that is distant from the reactor. In comparison, under the same conditions, a standard erbium-doped fiber will have an attenuation increment on the order of 1 dB/m. In this regard, an optical fiber in accordance with the present invention possesses sensitivity to irradiation close to that of an optical fiber having the same core matrix that is not doped with a rare earth element.

Exemplary optical fibers can be used in a compact optical amplifier situated in an environment with ionizing radiation, such as the Ethernet network of a particle physics laboratory, a nuclear power plant, or a satellite exposed to cosmic radiation. Combined with a system of mirrors or Bragg gratings, embodiments of the optical fiber of the present invention can also be used as a laser fiber in the same environments.

* * *

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.); and U.S. patent application Ser. No. 12/629,495 for an Amplifying Optical Fiber and Production Method, filed Dec. 2, 2009, (Pastouret et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical prop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber prop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat prop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); and U.S. patent application Ser. No. 12/615,737 for a Reduced-Diameter, Easy-Access Loose Tube Cable, filed Nov. 10, 2009, (Overton).

\* \* \*

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:
1. An optical fiber, comprising:
a central core comprising a core matrix; and
an optical inner cladding surrounding said central core;
wherein said core matrix comprises nanoparticles, said nanoparticles comprising a nanoparticle matrix that includes (i) at least about 85 weight percent silica and (ii) erbium (Er); and
wherein outside the absorption band of erbium and before any irradiation, the optical fiber has optical losses less than or equal to 1.5 dB/km at a wavelength of 1200 nanometers.
2. An optical fiber according to claim 1, wherein said nanoparticle matrix includes at least about 95 weight percent silica.
3. An optical fiber according to claim 1, wherein said core matrix is a silica-based matrix containing no phosphorus (P).

4. An optical fiber according to claim 1, wherein said core matrix is a silica-based matrix containing no alumina ($Al_2O_3$).

5. An optical fiber according to claim 1, wherein said core matrix consists essentially of said nanoparticles dispersed within a pure silica matrix.

6. An optical fiber according to claim 1, wherein said core matrix comprises a silica-based matrix doped with fluorine (F).

7. An optical fiber according to claim 1, wherein said core matrix comprises a silica-based matrix doped with nitrogen (N).

8. An optical fiber according to claim 1, wherein said core matrix comprises a silica-based matrix doped with germanium (Ge).

9. An optical fiber according to claim 1, wherein said nanoparticle matrix consists essentially of pure silica and one or more rare earth elements.

10. An optical fiber according to claim 1, wherein:
said nanoparticle matrix comprises alumina; and
the concentration of alumina in said central core is less than 3 weight percent.

11. An optical fiber according to claim 1, wherein the optical fiber has a gain width of between about 1 nanometer and 40 nanometers.

12. An optical fiber according to claim 1, wherein the optical fiber has a gain width of between about 1 nanometer and 30 nanometers.

13. An optical fiber according to claim 1, wherein said nanoparticle matrix includes ytterbium (Yb) and/or thulium (Tm).

14. An optical fiber according to claim 1, wherein, at ambient temperature, the optical fiber has a loss increment of less than 0.05 dB/m at a wavelength of 1550 nanometers under irradiation of 300 Gy at 0.08 Gy/min.

15. An optical amplifier comprising the optical fiber according to claim 1, wherein, at a wavelength of 1550 nanometers, less than 10 meters of the optical fiber is capable of producing an amplification gain of at least 25 dB.

16. A laser comprising the optical fiber according to claim 1.

17. An amplifying optical fiber, comprising:
a central core for transmitting and amplifying optical signals, said central core comprising discrete nanoparticles that include (i) at least about 85 weight percent silica and (ii) erbium (Er); and
an inner optical cladding for confining optical signals transmitted in said central core, said inner optical cladding surrounding said central core;
wherein outside the absorption band of erbium and before any irradiation, the optical fiber has optical losses less than or equal to 1.5 dB/km at a wavelength of 1200 nanometers.

18. An amplifying optical fiber according to claim 17, wherein the optical fiber has a gain width of between about 1 nanometer and 40 nanometers.

19. An amplifying optical fiber according to claim 17, wherein said discrete nanoparticles include ytterbium (Yb) and/or thulium (Tm).

20. The optical fiber according to claim 17, wherein, at ambient temperature, the optical fiber has a loss increment of less than 0.05 dB/m at a wavelength of 1550 nanometers under irradiation of 300 Gy at 0.08 Gy/min.

21. A method for making an optical-fiber primary preform, comprising:
synthesizing rare-earth-doped silica-based nanoparticles containing at least 85 weight percent silica by co-precipitating precursors of silica salts and rare earth salts in an aqueous solution, with a molar ratio of precursors of silica salts to precursors of rare earth salts of between about 30 and 300;
dispersing the nanoparticles in an aqueous solution; and
impregnating an internal porous layer of a silica tube with the aqueous solution containing nanoparticles in order to form the core of a primary preform.

22. A method according to claim 21, wherein the synthesized nanoparticles contain at least 95 weight percent silica.

23. An optical fiber, comprising:
a central core comprising a core matrix; and
an optical inner cladding surrounding said central core;
wherein said core matrix comprises nanoparticles, said nanoparticles comprising a nanoparticle matrix that includes (i) at least about 85 weight percent silica and (ii) at least one rare earth element; and
wherein, at ambient temperature, the optical fiber has a loss increment of less than 0.05 dB/m at a wavelength of 1550 nanometers under irradiation of 300 Gy at 0.08 Gy/min.

24. An optical fiber according to claim 23, wherein said nanoparticle matrix includes at least about 95 weight percent silica.

25. An optical fiber according to claim 23, wherein said core matrix consists essentially of said nanoparticles dispersed within a pure silica matrix.

26. An optical fiber according to claim 23, wherein said nanoparticle matrix consists essentially of pure silica and one or more rare earth elements.

27. An optical fiber according to claim 23, wherein said at least one rare earth element comprises erbium (Er), ytterbium (Yb), and/or thulium (Tm).

* * * * *